US011923159B2

(12) United States Patent
Yang et al.

(10) Patent No.: US 11,923,159 B2
(45) Date of Patent: Mar. 5, 2024

(54) KEYSWITCH STRUCTURE AND KEYCAP SUPPORT MECHANISM THEREOF

(71) Applicant: DARFON ELECTRONICS CORP., Taoyuan (TW)

(72) Inventors: Chen Yang, Taoyuan (TW); Ling-Hsi Chao, Taoyuan (TW); Shao-Lun Hsiao, Taoyuan (TW); Yu-Chun Hsieh, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/081,712

(22) Filed: Dec. 15, 2022

(65) Prior Publication Data

US 2023/0197366 A1 Jun. 22, 2023

Related U.S. Application Data

(60) Provisional application No. 63/356,558, filed on Jun. 29, 2022, provisional application No. 63/361,375, filed on Dec. 16, 2021.

(30) Foreign Application Priority Data

Oct. 18, 2022 (TW) .................................. 111139398

(51) Int. Cl.
*H01H 3/12* (2006.01)
*H01H 13/14* (2006.01)
*H01H 13/70* (2006.01)

(52) U.S. Cl.
CPC ............ *H01H 3/125* (2013.01); *H01H 13/14* (2013.01); *H01H 13/70* (2013.01); *H01H 2233/07* (2013.01)

(58) Field of Classification Search
CPC ........ H01H 3/125; H01H 13/14; H01H 13/70; H01H 2233/07; H01H 3/122; H01H 3/12;
(Continued)

(56) References Cited

U.S. PATENT DOCUMENTS 5,278,371 A * 1/1994 Watanabe .............. H01H 3/125
200/344
6,444,933 B1 9/2002 Chun
(Continued)

FOREIGN PATENT DOCUMENTS

CN 2423647 Y 3/2001
CN 202523604 U 11/2012
(Continued)

OTHER PUBLICATIONS

Yang, the specification, including the claims, and drawings in the U.S. Appl. No. 17/989,703, filed Nov. 18, 2022.
(Continued)

*Primary Examiner* — Lheiren Mae A Caroc
(74) *Attorney, Agent, or Firm* — Winston Hsu

(57) ABSTRACT

A keyswitch structure includes a keycap support mechanism and a keycap that is supported by the keycap support mechanism in a vertical direction. The keycap support mechanism includes a base and two supports. The base has two sliding slots. Each sliding slot has an opening in a horizontal direction and an obstruction block at the opening. The horizontal direction is perpendicular to the vertical direction. Each support has a sliding portion and a linkage portion. The sliding portions slide parallel to the horizontal direction in the sliding slots correspondingly. The obstruction block prevents the corresponding sliding portion from disengaging from the corresponding sliding slot. The two
(Continued)

linkage portions push against each other in line contact, so that the two supports are mutually driven through the two linkage portions.

20 Claims, 8 Drawing Sheets

(58) Field of Classification Search
CPC ... H01H 13/10; H01H 13/705; H01H 13/7065
See application file for complete search history.

(56) References Cited

U.S. PATENT DOCUMENTS

| | | | | |
|---|---|---|---|---|
| 9,634,661 | B1 | 4/2017 | Chen | |
| 9,952,682 | B2 | 4/2018 | Zhang | |
| 10,509,482 | B1 * | 12/2019 | Tsai | G06F 3/0202 |
| 11,114,260 | B2 | 9/2021 | Li | |
| 11,342,134 | B2 | 5/2022 | Ruff | |
| 11,721,500 | B2 * | 8/2023 | Chang | H01H 13/14 200/345 |
| 2005/0217983 | A1 | 10/2005 | Hsu | |
| 2017/0264294 | A1 | 9/2017 | Li | |
| 2019/0267200 | A1 | 8/2019 | Wu | |
| 2020/0294733 | A1 | 9/2020 | Ruff | |
| 2020/0328044 | A1 | 10/2020 | Chao | |
| 2020/0381190 | A1 | 12/2020 | Ruff | |
| 2020/0395178 | A1 | 12/2020 | Chao | |
| 2020/0402735 | A1 | 12/2020 | Chuang | |
| 2023/0197372 | A1 * | 6/2023 | Yang | H01H 3/122 200/344 |

FOREIGN PATENT DOCUMENTS

| | | | |
|---|---|---|---|
| CN | 104299828 | A | 1/2015 |
| CN | 204441139 | U | 7/2015 |
| CN | 205016398 | U | 2/2016 |
| CN | 205487874 | U | 8/2016 |
| CN | 105118723 | B | 11/2017 |
| CN | 107017870 | B | 8/2018 |
| CN | 108962654 | A | 12/2018 |
| CN | 110047677 | A | 7/2019 |
| CN | 110199369 | A | 9/2019 |
| CN | 110379661 | A | 10/2019 |
| CN | 110444429 | A | 11/2019 |
| CN | 209627348 | U | 11/2019 |
| CN | 106887358 | B | 3/2020 |
| CN | 111180233 | A | 5/2020 |
| CN | 111684559 | A | 9/2020 |
| CN | 108206112 | B | 4/2021 |
| TW | 200534312 | A | 10/2005 |
| TW | I246701 | | 1/2006 |
| TW | 201611064 | A | 3/2016 |
| TW | I665701 | B | 7/2019 |
| TW | M603617 | U | 11/2020 |
| WO | 2017/181313 | A1 | 10/2017 |
| WO | 2019/052377 | A1 | 3/2019 |

OTHER PUBLICATIONS

Yang, the specification, including the claims, and drawings in the U.S. Appl. No. 18/071,533, filed Nov. 29, 2022.
Yang, the specification, including the claims, and drawings in the U.S. Appl. No. 18/066,412, filed Dec. 15, 2022.

* cited by examiner

KEYSWITCH STRUCTURE AND KEYCAP SUPPORT MECHANISM THEREOF

CROSS REFERENCE TO RELATED APPLICATIONS

This application claims the benefit of U.S. Provisional Application No. 63/361,375, filed on Dec. 16, 2021. Further, this application claims the benefit of U.S. Provisional Application No. 63/356,558, filed on Jun. 29, 2022. The contents of these applications are incorporated herein by reference.

BACKGROUND OF THE INVENTION

1. Field of the Invention

The present invention relates to a keyswitch structure and a keycap support mechanism thereof.

2. Description of the Prior Art

The architecture of the current mechanical keyswitch is mainly to connect the keycap and the base with a lift mechanism, so that the keycap can move up and down relative to the base. The stability of the keycap movement, including the stroke and smoothness of the movement, usually relies on the lift mechanism. The supports of the mechanical keyswitch are pivotally connected through a hole-shaft structure. However, the hole-shaft structure needs to occupy a certain space, which makes it difficult to reduce the thickness of the supports, which is not conducive to low-profile designs. Furthermore, when the keyswitch structure is reduced in size, the structural design is limited, and the connection structure between the supports and the base is often unstable, causing the supports to be easily detached from the base.

SUMMARY OF THE INVENTION

An objective of the invention is to provide a keycap support mechanism. Two supports of the keycap support mechanism are mutually driven through line contact. Sliding slots on a base of the keycap support mechanism are respectively provided with an obstruction block, which can prevent the corresponding support from being detached from the corresponding sliding slot, making the keycap support mechanism structurally stable.

A keycap support mechanism according to the invention is used to support a keycap in a vertical direction. The keycap support mechanism includes a base, a first support, and a second support. The base has a first sliding slot and a second sliding slot. The first sliding slot has a first opening in a horizontal direction and a first obstruction block located at the first opening. The second sliding slot has a second opening in the horizontal direction and a second obstruction block located at the second opening. The horizontal direction is perpendicular to the vertical direction. The first support has a first sliding portion and a first linkage portion. The first sliding portion is constrained by the first obstruction block to slide parallel to the horizontal direction in the first sliding slot. The second support has a second sliding portion and a second linkage portion. The second sliding portion is constrained by the second obstruction block to slide parallel to the horizontal direction in the second sliding slot. The first linkage portion and the second linkage portion push against each other in line contact, so that the first support and the second support are mutually driven through the first linkage portion and the second linkage portion. Thereby, the linkage between the first support and the second support does not need to be based on the traditional hole-shaft structure, which is conducive to designs of low-profile keyswitch. Furthermore, the obstruction block can prevent the sliding part of the corresponding support from being detached from the corresponding sliding slot, which increases the stability of the keycap support mechanism.

Another objective of the invention is to provide a keyswitch structure, which includes the above keycap support mechanism so that the keyswitch structure is structurally stable.

A keyswitch structure according to the invention includes a keycap and a keycap support mechanism. The keycap support mechanism supports the keycap in a vertical direction and includes a base, a first support, and a second support. The base has a first sliding slot and a second sliding slot. The first sliding slot has a first opening in a horizontal direction and a first obstruction block located at the first opening. The second sliding slot has a second opening in the horizontal direction and a second obstruction block located at the second opening. The horizontal direction is perpendicular to the vertical direction. The first support has a first sliding portion and a first linkage portion. The first sliding portion is constrained by the first obstruction block to slide parallel to the horizontal direction in the first sliding slot. The second support has a second sliding portion and a second linkage portion. The second sliding portion is constrained by the second obstruction block to slide parallel to the horizontal direction in the second sliding slot. The first linkage portion and the second linkage portion push against each other in line contact, so that the first support and the second support are mutually driven through the first linkage portion and the second linkage portion. The keycap can move relative to the base in the vertical direction through the first support and the second support. Similarly, the linkage between the first support and the second support does not need to be based on the traditional hole-shaft structure, which is conducive to designs of low-profile keyswitch. Furthermore, the obstruction block can prevent the sliding part of the corresponding support from being detached from the corresponding sliding slot, which increases the stability of the keycap support mechanism.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
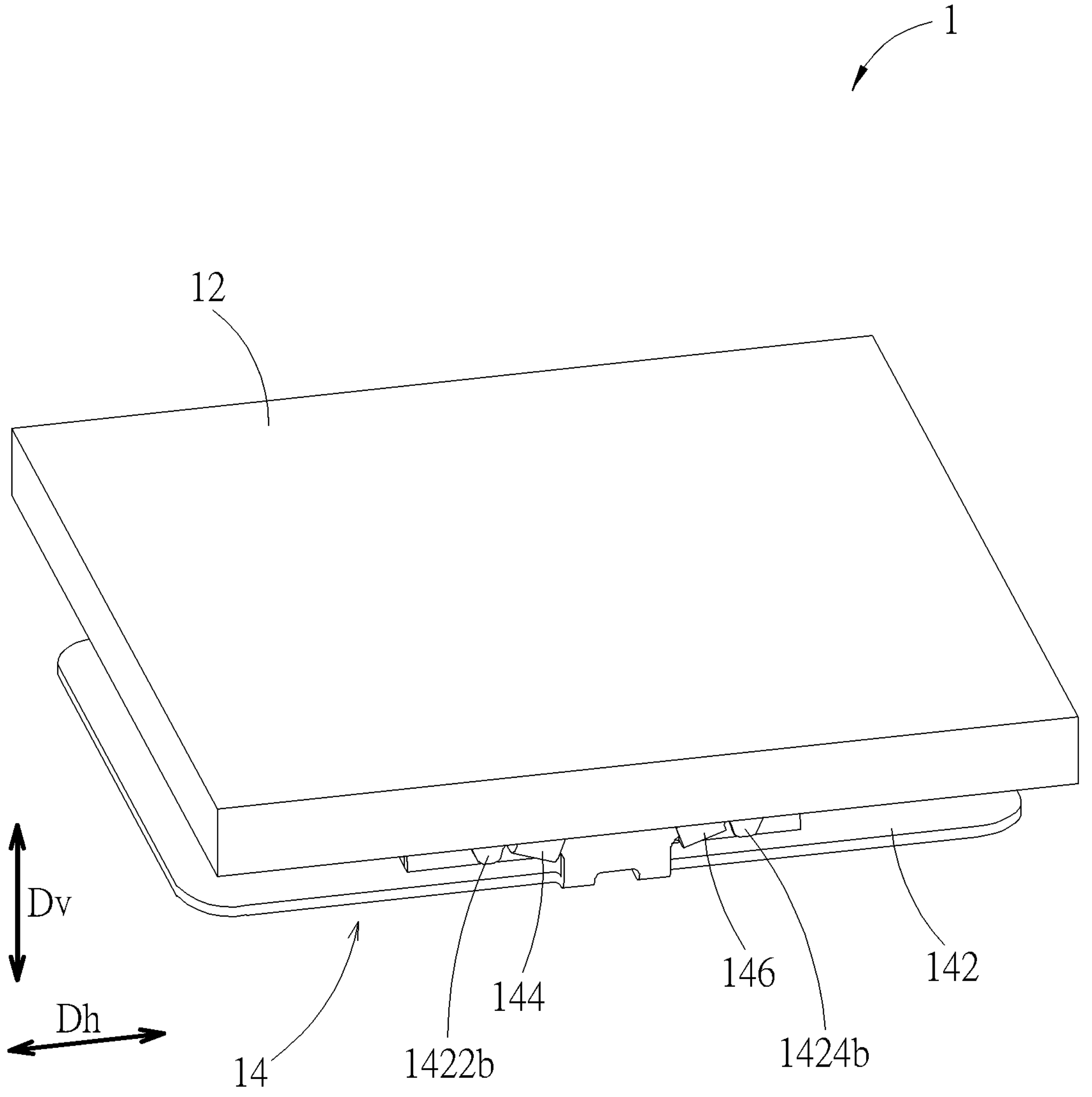
FIG. 1 is a schematic diagram illustrating a keyswitch structure according to an embodiment.

Please refer to FIG. 1 to FIG. 4. A keyswitch structure 1 according to an embodiment includes a keycap 12 and a keycap support mechanism 14. The keycap support mechanism 14 supports the keycap 12 in a vertical direction Dv (indicated by a two-headed arrow in the figures). The keycap support mechanism 14 includes a base 142, a first support 144, a second support 146, and a force-applying device 148. The first support 144 and the second support 146 are disposed opposite to each other in a horizontal direction Dh (indicated by a two-headed arrow in the figures) and are connected to and between the keycap 12 and the base 142, so that the keycap 12 can move up and down relative to the base 142 (i.e., to move parallel to the vertical direction Dv) through the first support 144 and the second support 146. The first support 144 and the second support 146 drive are linked directly, so that the first support 144 and the second support 146 can drive each other to rotate relative to the base 142. The force-applying device 148 is connected to the first support 144 and the second support 146 and applies force to the first support 144 and the second support 146 to force the first support 144 and the second support 146 against each other to drive the first support 144 and the second support 146 to jointly lift the keycap 12 (i.e., to move upwards to its original position parallel to the vertical direction Dv).

Figure 2:
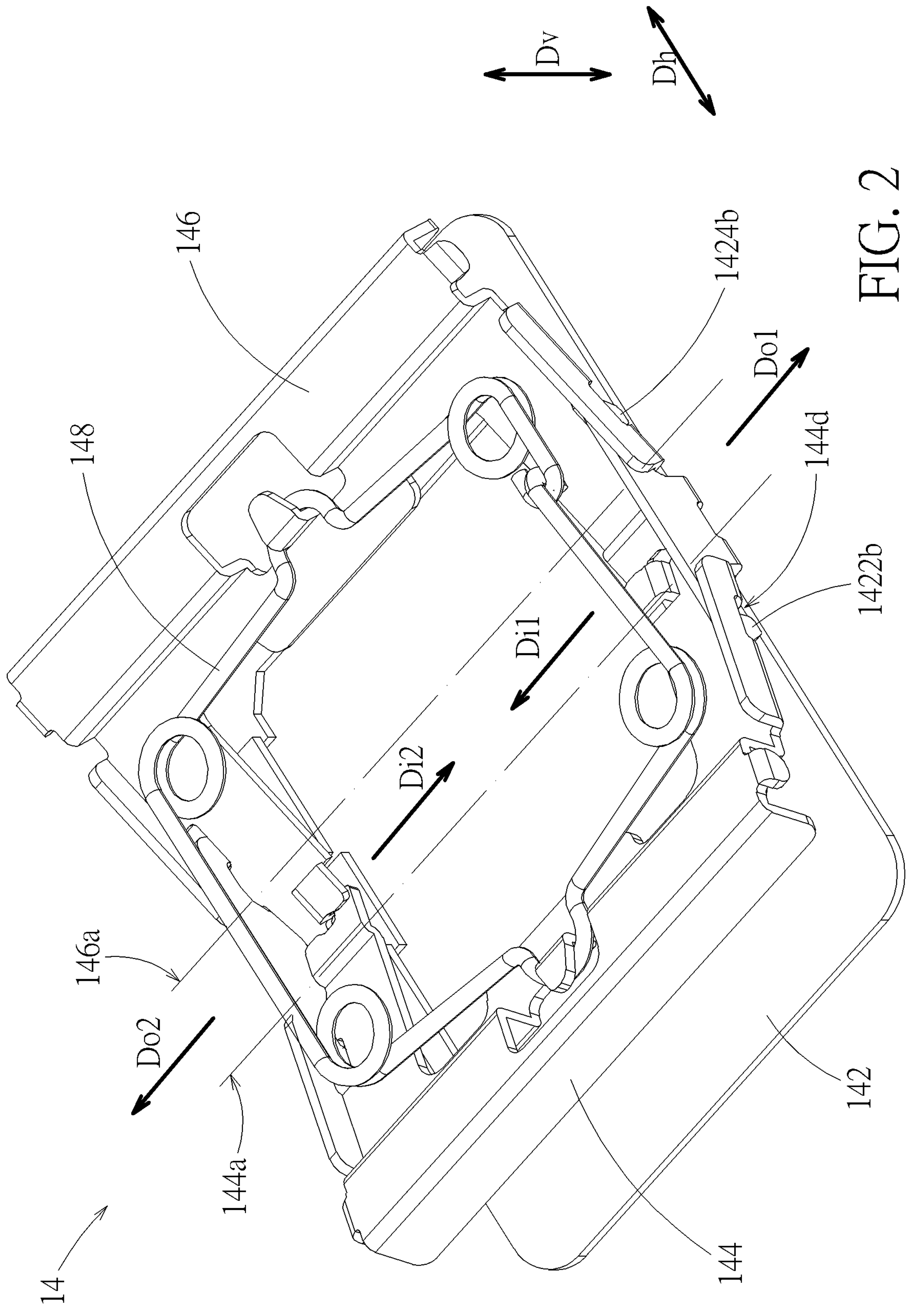
FIG. 2 is a schematic diagram illustrating a keycap support mechanism of the keyswitch structure in FIG. 1.

In FIG. 2, the rotation axis 144*a* of the first support 144 relative to the base 142 is indicated by a chain line in the figure. The rotation axis 144*a* is perpendicular to the vertical direction Dv and the horizontal direction Dh. During the actual rotation of the first support 144, the position of the rotation axis 144*a* will move. The rotation axis 144*a* in FIG. 2 is only an instantaneous rotation axis of the first support 144 in this figure. Please refer to FIG. 2 to FIG. 7. The first support 144 has a first sliding portion 1442, a first linkage portion 1444, and a keycap connecting portion 1446. The base 142 has a first sliding slot 1422 correspondingly. The first sliding slot 1422 has a first opening 1422*a* in the horizontal direction Dh and a first obstruction block 1422*b* located at the first opening 1422*a*. The first sliding portion 1442 is slidably disposed in the first sliding slot 1422. The first obstruction block 1422*b* reduces the size of the first opening 1422*a* to prevent the first sliding portion 1442 from departing away from the first sliding slot 1422 in the horizontal direction Dh. The first support 144 is connected to the keycap 12 through the keycap connecting portion 1446. The first sliding portion 1442 is located between the keycap connecting portion 1446 and the first linkage portion 1442.

Similarly, in FIG. 2, the rotation axis 146*a* of the second support 146 relative to the base 142 is indicated by a chain line in the figure. The rotation axis 146*a* is perpendicular to the vertical direction Dv and the horizontal direction Dh. During the actual rotation of the second support 146, the position of the rotation axis 146*a* will move. The rotation axis 146*a* in FIG. 2 is only an instantaneous rotation axis of the second support 146 in this figure. Please refer to FIG. 2 to FIG. 7. The second support 146 has a second sliding portion 1462, a second linkage portion 1464, and a keycap connecting portion 1466. The base 142 has a second sliding slot 1424 correspondingly. The second sliding slot 1424 has a second opening 1424*a* in the horizontal direction Dh and a second obstruction block 1424*b* located at the second opening 1424*a*. The second sliding portion 1462 is slidably disposed in the second sliding slot 1424. The second obstruction block 1424*b* reduces the size of the second t opening 1424*a* to prevent the second sliding portion 1462 from departing away from the second sliding slot 1424 in the horizontal direction Dh. The second support 146 is connected to the keycap 12 through the keycap connecting portion 1466. The second sliding portion 1462 is located between the keycap connecting portion 1466 and the second linkage portion 1462.

Please refer to FIG. 2 to FIG. 6. In a view direction perpendicular to the vertical direction Dv and the horizontal direction Dh, the first support 144 and the second support 146 are arranged in a V-shaped configuration. The first linkage portion 1444 and the second linkage portion 1464 push against each other in line contact, so that the first support 144 and the second support 146 are linked with each other (i.e., being mutually driven to rotate relative to the base 142) through the first linkage portion 1444 and the second linkage portion 1464. In details, in this embodiment, the first linkage portion 1444 includes a basic engaging portion 1444*a* and an offset engaging portion 1444*b*. The basic engaging portion 1444*a* and the offset engaging portion 1444*b* are arranged at intervals in an arrangement direction Da (indicated by a two-headed arrow in FIG. 5). The arrangement direction Da is perpendicular to the rotation axis 144*a*. The second linkage portion 1464 is located between the basic engaging portion 1444*a* and the offset engaging portion 1444*b* in the arrangement direction Da, so that the first linkage portion 1444 and the second linkage portion 1464 are engaged. On the other hand, the second linkage portion 1464 is partially located above the basic engaging portion 1444*a* of the first linkage portion 1444, and the second linkage portion 1464 is partially located below the offset engaging portion 1444*b* of the first linkage portion 1444. Thereby, the first support 144 and the second support 146 are mutually driven through the first linkage portion 1444 and the second linkage portion 1464, so that even if the position where a user presses the keycap 12 is not at the middle portion of the keycap 12, the keycap 12 can still keep moving downward substantially horizontally. For example, when the first support 144 bears the main portion of the pressing force and rotates downward (towards the base 142), a upper surface 1444*c* of the basic engaging portion 1444*a* pushes against an edge 1464*a* of the second linkage portion 1464 to make the second support 146 also rotated downward, achieving the effect of the keycap 12 moving down horizontally. For another example, when the second support 146 bears the main portion of the pressing force and rotates downward, a upper surface 1464*b* of the second linkage portion 1464 pushes against an edge 1444*d* of the offset engaging portion 1444*b* to make the first support 144 also rotated downward, achieving the effect of the keycap 12 moving down horizontally. Afterward, when the keycap 12 is no longer pressed, the first support 144 and the second support 146 will rotate upward under the action of the force-applying device 148 to lift the keycap 12 to its original position.

Furthermore, as shown by FIG. 2 to FIG. 6, in the embodiment, the first support 144 is an n-shaped structure which includes two side arm portions 144*b* and a transverse connecting portion 144*c* connecting the two side arm portions 144*b*. The side arm portion 144*b* extends in an extending direction De1 (indicated by a two-headed arrow in the figures). The extending direction De1 is perpendicular to the rotation axis 144*a* and the arrangement direction Da. The keycap connecting portion 1446 includes two connecting structures 1446*a* on two end portions of the transverse connecting portion 144*c*. The first support 144 is connected to the keycap 12 through the two connecting structures 1446*a*. The first support 144 also includes a third sliding portion 1448 and a third linkage portion 1450. The first sliding portion 1442 and the third sliding portion 1448 are located at two sides of the first support 144. The first linkage portion 1444 and the third linkage portion 1450 are also located at two sides of the first support 144. The first sliding portion 1442 and the first linkage portion 1444 are located on one of the side arm portions 144*b*, and the first linkage portion 1444 is located on an end portion of this side arm portion 144*b* in the extending direction De1. The third sliding portion 1448 and the third linkage portion 1450 are located on the other one of the side arm portions 144*b*, and the third linkage portion 1450 is located on an end portion of this side arm portion 144*b* in the extending direction De1. The third sliding portion 1448 is located between the third linkage portion 1450 and the connecting structure 1446*a*. The base 142 has a third sliding slot 1426 correspondingly. The third sliding portion 1448 is constrained to slide parallel to the horizontal direction Dh in the third sliding slot 1426.

Similarly, the second support 146 is also an n-shaped structure which includes two side arm portions 146*b* and a transverse connecting portion 146*c* connecting the two side arm portions 146*b*. The side arm portion 146*b* extends in an extending direction De2 (indicated by a two-headed arrow in the figures). The extending direction De2 is perpendicular to the rotation axis 146*a*. The keycap connecting portion 1466 includes two connecting structures 1466*a* on two end portions of the transverse connecting portion 146*c*. The second support 146 is connected to the keycap 12 through the two connecting structures 1446*a*. The second support 146 also includes a fourth sliding portion 1468 and a fourth linkage portion 1470. The second sliding portion 1462 and the fourth sliding portion 1468 are located at two sides of the second support 146. The second linkage portion 1464 and the fourth linkage portion 1470 are also located at two sides of the second support 146. The second sliding portion 1462 and the second linkage portion 1464 are located on one of the side arm portions 146*b*, and the second linkage portion 1464 is located on an end portion of this side arm portion 146*b* in the extending direction De2. The fourth sliding portion 1468 and the fourth linkage portion 1470 are located on the other one of the side arm portions 146*b*, and the fourth linkage portion 1470 is located on an end portion of this side arm portion 146*b* in the extending direction De2. The fourth sliding portion 1468 is located between the fourth linkage portion 1470 and the connecting structure 1466*a*. The base 142 has a fourth sliding slot 1428 correspondingly. The fourth sliding portion 1468 is constrained to slide parallel to the horizontal direction Dh in the third sliding slot 1428. The third linkage portion 1450 and the fourth linkage portion 1470 push against each other in line contact. Thereby, the first support 144 and the second support 146 are mutually driven through the first linkage portion 1444, the second linkage portion 1464, the third linkage portion 1450, and the fourth linkage portion 1470.

Furthermore, in the embodiment, the third linkage portion 1450 and the second linkage portion 1462 have the same structure, and the fourth linkage portion 1470 and the first linkage portion 1444 have the same structure. Hence, for the engagement relationship between the third linkage portion 1450 and the fourth linkage portion 1470, please refer to the above descriptions of the engagement relationship between the first linkage portion 1444 and the second linkage portion 1464, which will not be repeated in addition. Furthermore, in the embodiment, the first support 144 and the second support 146 have the same structure, which helps to reduce the cost of component manufacturing and management. In practice, the first support 144 and the second support 146 may respectively be formed by but not limited to stamping a metal plate. In addition, the basic engaging portion 1444*a* and the offset engaging portion 1444*b* are staggered in a direction parallel to the rotation axis 144*a* (referring to FIG. 2), which is conducive to reduction of the thickness of the supports.

Figure 8:
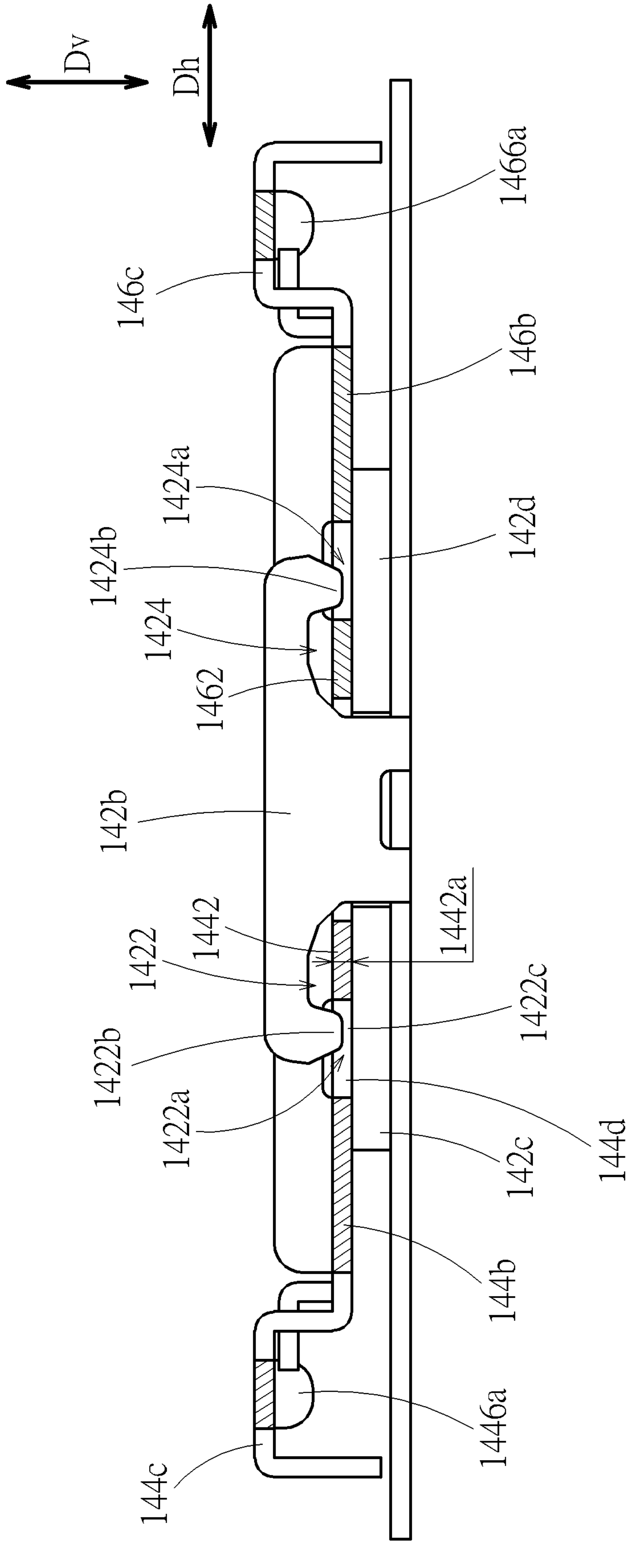
FIG. 8 is a sectional view of the keycap support mechanism in FIG. 2, in which the position of the cutting plane is equivalent to the line X-X in FIG. 3 and the first support and the second support are placed horizontally.

Please refer to FIG. 2 to FIG. 8. In the embodiment, the base 142 has a bottom portion 142*a*, a side wall 142*b* extending from the bottom portion 142*a* parallel to the vertical direction Dv and the horizontal direction Dh, and a first protruding portion 142*c* and a second protruding portion 142*d* protruding upward from the bottom portion 142. The side wall 142*b* and the first protruding portion 142*c* jointly form the first sliding slot 1422, and the side wall 142*b* and the second protruding portion 142*d* jointly form the second sliding slot 1424. The side wall 142*b* forms the first obstruction block 1422*b* and the second obstruction block 1424*b*. The first opening 1422*a* and the second opening 1424*a* are directed in opposite directions (i.e., toward the left and the right, respectively, in FIG. 7 or FIG. 8). In the embodiment, the first support 144 is a bent plate. The side arm portion 144*b* of the first support 144 corresponding to the of the first sliding portion 1442 has a through hole 144*d*. The first sliding portion 1442 is adjacent to the through hole 144*d* and is a plate structure. The first obstruction block 1422*b* is located in the through hole 144*d*. As shown by FIG. 8, the first obstruction block 1422*b* and the first protruding portion 142*c* form a gap 1422*c* in the vertical direction Dv. The thickness 1442*a* of the first sliding portion 1442 is greater than the gap 1422*c*, which can prevent or obstruct the first sliding portion 1442 from departing from the first sliding slot 1422 via the first opening 1422*a* in the horizontal direction Dh. Furthermore, the first sliding slot 1422 itself has a positioning effect on the first sliding portion 1442 in the vertical direction Dv. The descriptions about the structural configuration of the first sliding slot 1422 and the first sliding portion 1442 are also applicable to the other sliding slots 1424, 1426 and 1428, sliding portions 1448, 1462 and 1468, and side wall 142*b*' of the base 142, and will not be repeated here. In addition, in practice, the base 142 may be formed by but not limited to stamping a metal plate.

Figure 3:
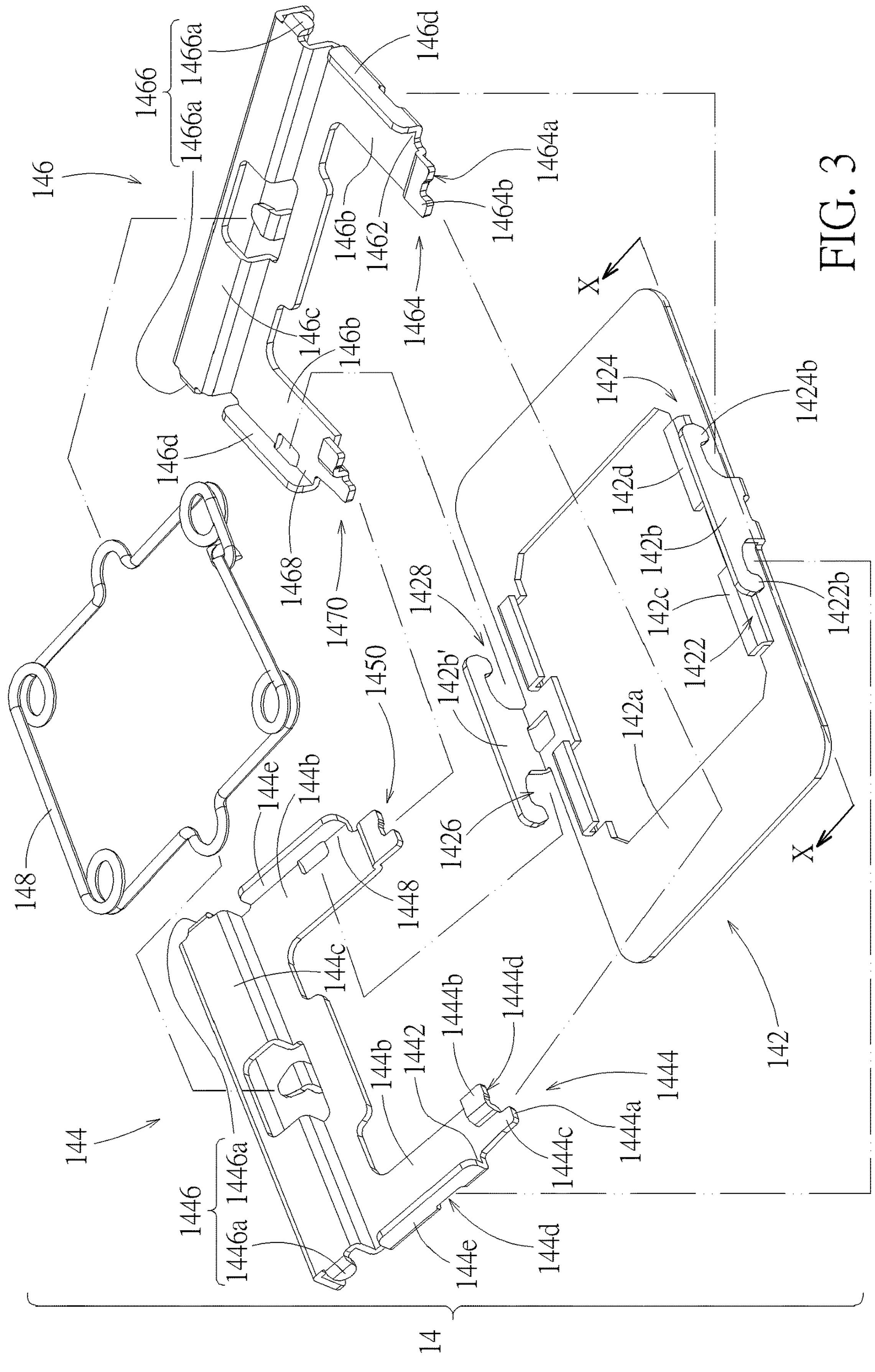
FIG. 3 is an exploded view of the keycap support mechanism in FIG. 2.
Figure 4:
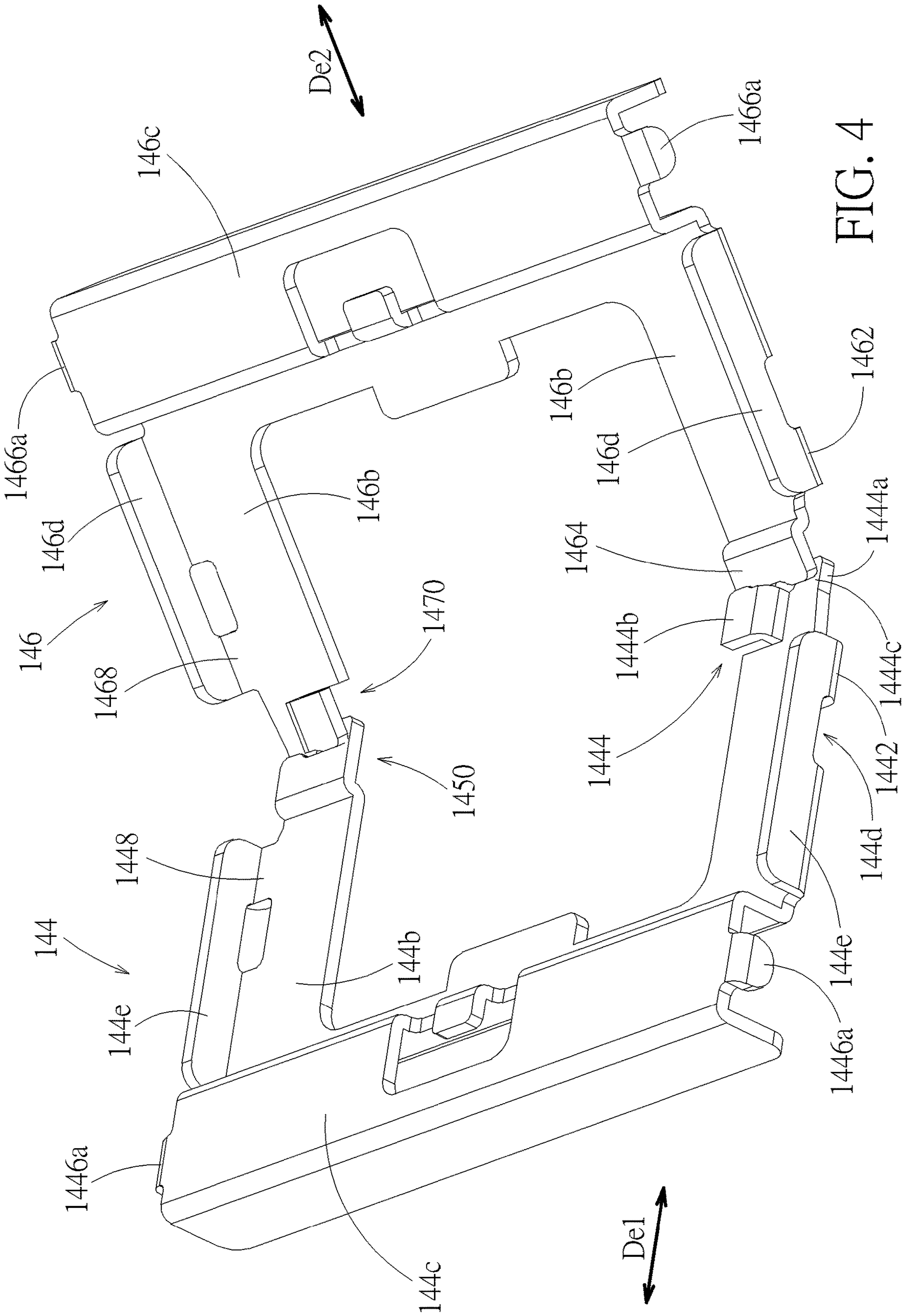
FIG. 4 is a schematic diagram illustrating a first support and a second support of the keycap support mechanism in FIG. 2.
Figure 5:
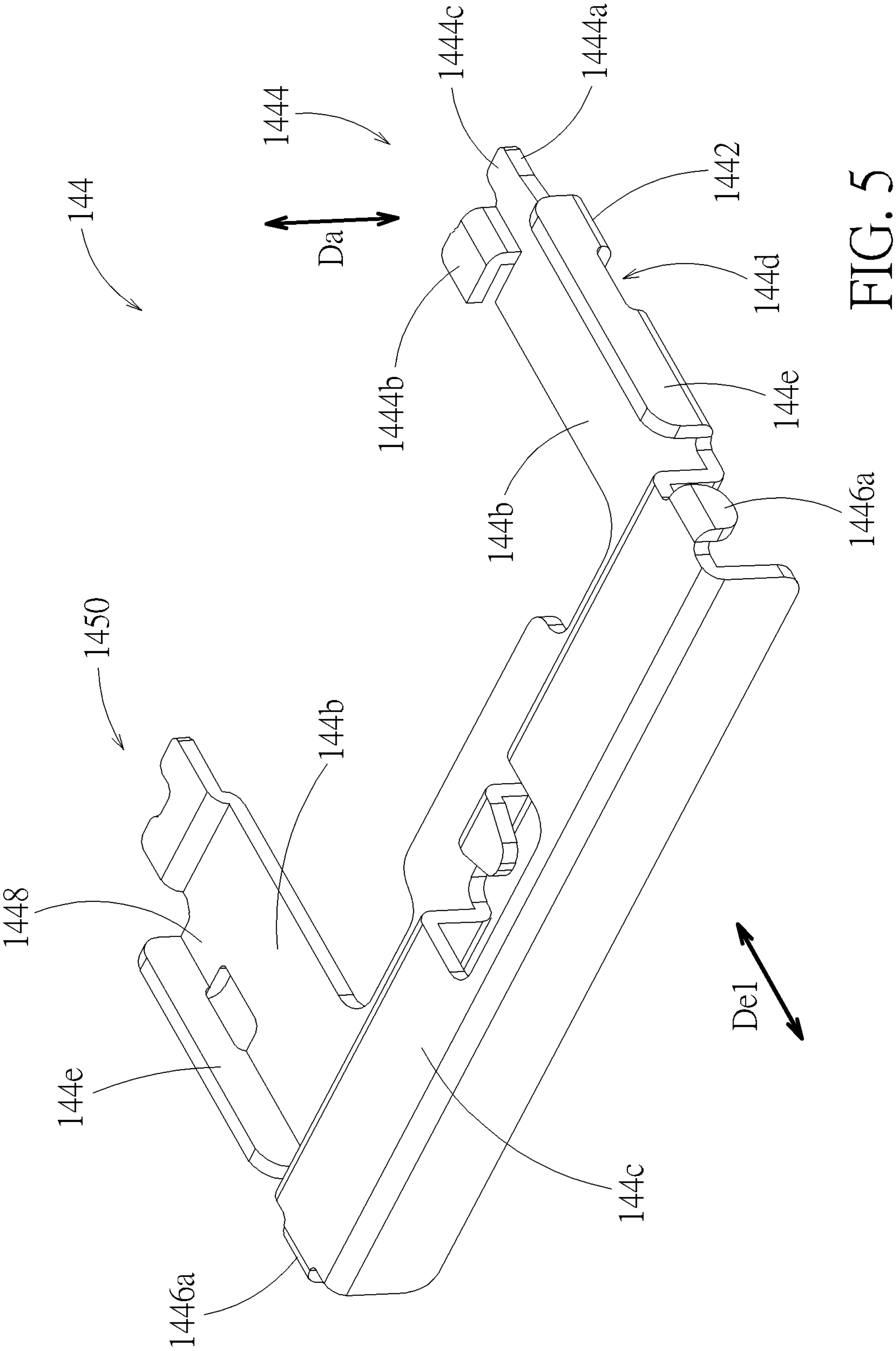
FIG. 5 is a schematic diagram illustrating the first support of the keycap support mechanism in FIG. 2 in another view point.
Figure 6:
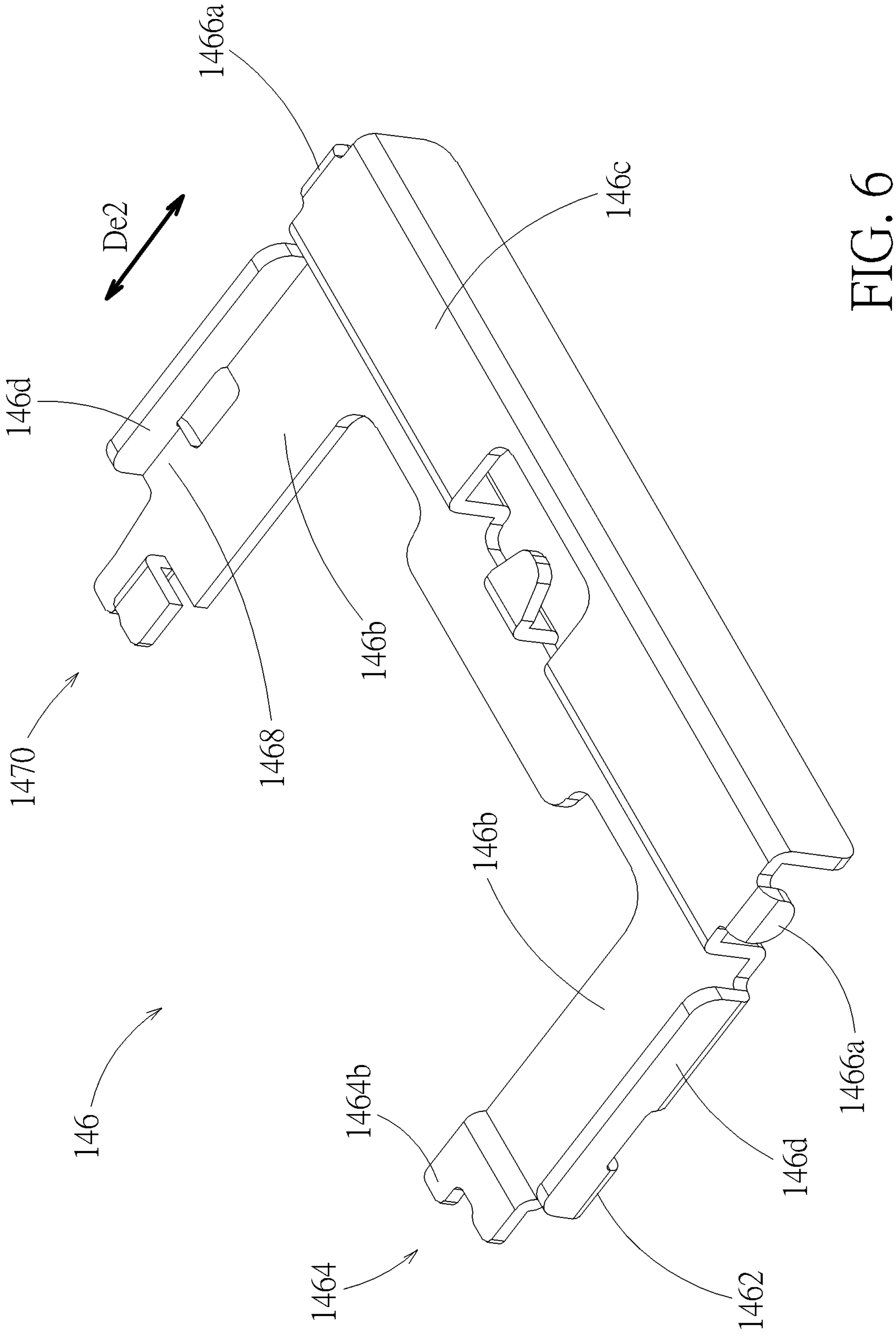
FIG. 6 is a schematic diagram illustrating the second support of the keycap support mechanism in FIG. 2 in another view point.
Figure 7:
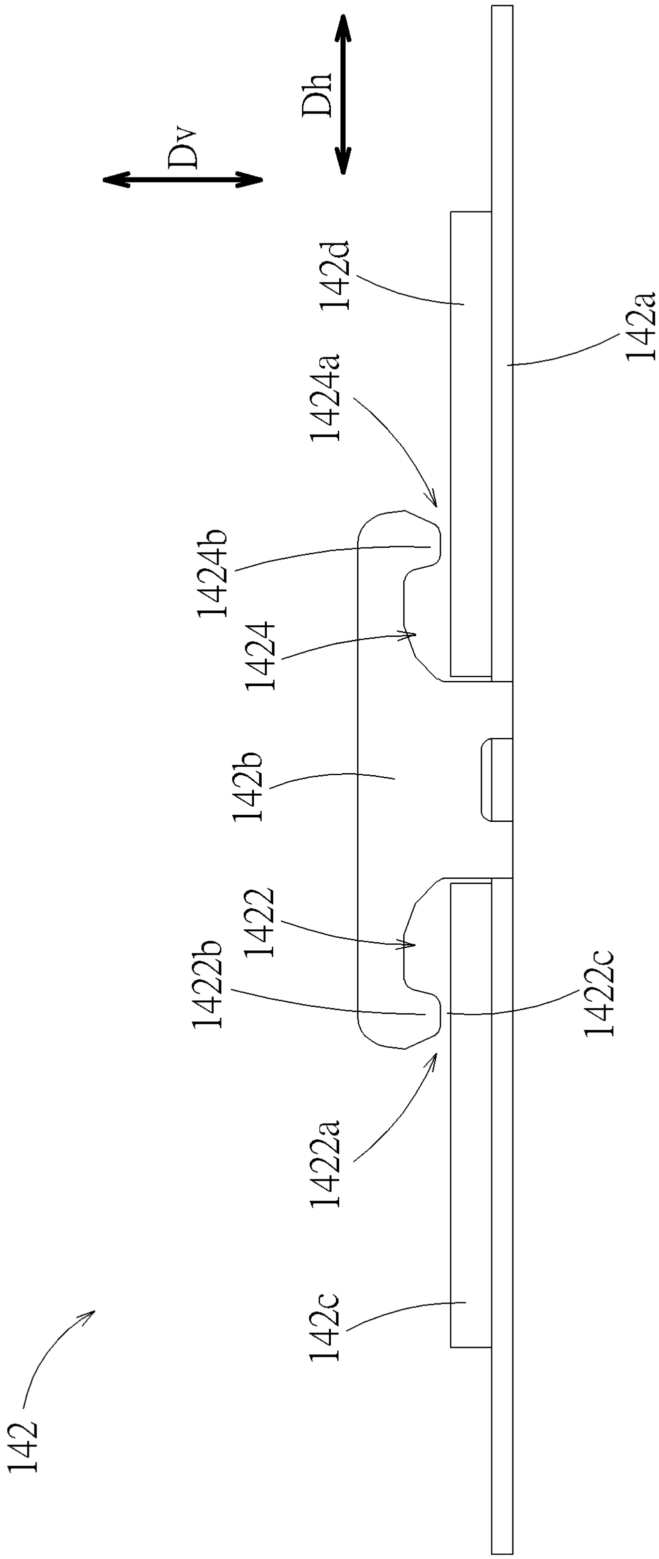
FIG. 7 is a side view of a base of the keycap support mechanism in FIG. 2.

Furthermore, as shown by FIG. 2 and FIG. 3, in the embodiment, the first to fourth linkage portions 1444, 1464, 1450 and 1470 are located between the side walls 142*b* and 142*b*'. The side arm portions 144*b* of the first support 144 and the side arm portions 146 of the second support 146 are structurally partially located between the side walls 142*b* and 142*b*', so the side walls 142*b* and 142*b*' can prevent the first support 144 and the second support 146 from moving outward relative to the base 142 parallel to the rotation axes 144*a* and 146*a* (e.g., moving in directions Do1 and Do2 in FIG. 2). Furthermore, the two side arm portions 144*b* of the first support 144 respectively have a vertical side plate 144*e* located outside the side walls 142*b* and 142*b*', so the side walls 142*b* and 142*b*' can also prevent the first support 144 from moving inward relative to the base 142 parallel to the rotation axes 144*a* and 146*a* (e.g., moving in directions Di1 and Di2 in FIG. 2). Similarly, the two side arm portions 146*b* of the second support 146 respectively have a vertical side plate 146*d* located outside the side walls 142*b* and 142*b*', so the side walls 142*b* and 142*b*' can also prevent the second support 146 from moving inward relative to the base 142 parallel to the rotation axes 144*a* and 146*a*. Therefore, the first support 144 and the second support 146 can be positioned in a direction parallel to the rotation axis 144*a* and 146*a*. Furthermore, according to the relevant descriptions in the foregoing, the first sliding slot 1422 and second sliding slot 1424 of the base 142 have the positioning effect on the first sliding portion 1442 and the second sliding portion 1462 in the vertical direction Dv, and can prevent the first sliding portion 1442 and the second sliding portion 1462 from departing from the first sliding slot 1422 and the second sliding slot 1424 in the horizontal direction Dh, so the base 142 can prevent the first support 144 and the second support 146 from departing from the base 142 in the vertical direction Dv and the horizontal direction Dh. Thereby, even if the user presses the keycap 12 non-vertically so that the first support 144 or the second support 146 receives a lateral force (e.g., perpendicular to the vertical direction Dv), the first support 144 and the second support 146 can still maintain a stable connection with the base 142 and act smoothly. Please refer to FIG. 2 and FIG. 3. In the embodiment, the force-applying device 148 is realized by a spring; however, it is not limited thereto in practice. The force-applying device 148 applies force to the transverse connecting portion 144*c* of the first support 144 and the transverse connecting portion 146*c* of the second support 146 to drive the transverse connecting portion 144*c* of the first support 144 and the transverse connecting portion 146*c* of the second support 146 to relatively move toward each other to lift the keycap 12. Therefore, the force-applying device 148 has the function of resetting the keyswitch structure. In practice, the force-applying device 148 can also be realized by other components with a reset function, such as an elastic circular protrusion or a spring (which can be pressed downward by the keycap 12) disposed under the keycap 12.

Furthermore, in the embodiment, the base 142 may include a switch (not shown in the figures). The keycap 12 can move down (toward the base 142) to trigger the switch. For example, the switch may be realized by a membrane circuit board. The membrane circuit board is a multi-layer structure (such as a sandwich structure, including upper and lower layers carrying switch circuits, and an insulating layer sandwiched between the upper and lower layers), which may be disposed above or under the base 142. The switch on the membrane circuit board can be triggered by a triggering structure on the keycap 12 or the support 144 or 146. For another example, the switch may be realized by a tactile switch (e.g., disposed on a circuit board disposed above or under the base 142, and triggered by the above triggering structure).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keycap support mechanism for supporting a keycap in a vertical direction, the keycap support mechanism comprising:

a base, the base having a first sliding slot and a second sliding slot, the first sliding slot having a first opening in a horizontal direction and a first obstruction block located at the first opening, the second sliding slot having a second opening in the horizontal direction and a second obstruction block located at the second opening, the horizontal direction being perpendicular to the vertical direction;

a first support, the first support having a first sliding portion and a first linkage portion, the first sliding portion being constrained by the first obstruction block to slide parallel to the horizontal direction in the first sliding slot; and a second support, the second support having a second sliding portion and a second linkage portion, the second sliding portion being constrained by the second obstruction block to slide parallel to the horizontal direction in the second sliding slot, the first linkage portion and the second linkage portion pushing against each other in line contact, so that the first support and the second support are mutually driven through the first linkage portion and the second linkage portion.

2. The keycap support mechanism according to claim 1, wherein the first support has a through hole, and the first obstruction block is located in the through hole.

3. The keycap support mechanism according to claim 2, wherein a rotation axis of the first support relative to the base is perpendicular to the vertical direction and the horizontal direction, the first support has a side arm portion, the side arm portion extends in an extending direction, the extending direction is perpendicular to the rotation axis, the first linkage portion is located on the side arm portion, and the through hole is located on the side arm portion.

4. The keycap support mechanism according to claim 1, wherein the first opening and the second opening are directed in opposite directions.

5. The keycap support mechanism according to claim 1, wherein the base has a bottom portion, a side wall extending from the bottom portion parallel to the vertical direction and the horizontal direction, and first and second protruding portions protruding upward from the bottom portion, the side wall and the first protruding portion jointly form the first sliding slot, and the side wall and the second protruding portion jointly form the second sliding slot.

6. The keycap support mechanism according to claim 5, wherein the side wall forms the first obstruction block and the second obstruction block.

7. The keycap support mechanism according to claim 6, wherein the first sliding portion is a plate structure, the first obstruction block and the first protruding portion form a gap in the vertical direction, and a thickness of the first sliding portion is greater than the gap.

8. The keycap support mechanism according to claim 5, wherein a rotation axis of the first support relative to the base is perpendicular to the vertical direction and the horizontal direction, the first support has a side arm portion, the side arm portion extends in an extending direction, the extending direction is perpendicular to the rotation axis, the first linkage portion is located on the side arm portion, and the side arm portion has a vertical side plate at a side of the side wall.

9. The keycap support mechanism according to claim 1, wherein a rotation axis of the first support relative to the base is perpendicular to the vertical direction and the horizontal direction, the first support has a side arm portion, the side arm portion extends in an extending direction, the extending direction is perpendicular to the rotation axis, the first linkage portion is located at an end of the side arm portion in the extending direction, the first linkage portion comprises a basic engaging portion and an offset engaging portion, the basic engaging portion and the offset engaging portion are arranged at an interval in an arrangement direction, and the arrangement direction is perpendicular to the extending direction and the rotation axis.

10. The keycap support mechanism according to claim 9, wherein the second linkage portion is located between the basic engaging portion and the offset engaging portion in the arrangement direction.

11. The keycap support mechanism according to claim 1, wherein the first support has a keycap connecting portion, and the first sliding portion is located between the keycap connecting portion and the first linkage portion.

12. The keycap support mechanism according to claim 1, wherein the first support has a third linkage portion, the first linkage portion and the third linkage portion are located on two sides of the first support, the second support has a fourth linkage portion, and the third linkage portion and the fourth linkage portion push against each other in line contact, so that the first support and the second support are mutually driven through the first linkage portion, the second linkage portion, the third linkage portion, and the fourth linkage portion.

13. The keycap support mechanism according to claim 12, wherein the first support and the second support have the same structure.

14. The keycap support mechanism according to claim 1, further comprising a force-applying device connected to and between the first support and the second support, the force-applying device applying force to the first support and the second support to force the first linkage portion and the second linkage portion to push against each other.

15. A key switch structure, comprising:

a keycap; and a keycap support mechanism, the keycap support mechanism supporting the keycap in a vertical direction and comprising:

a base, the base having a first sliding slot and a second sliding slot, the first sliding slot having a first opening in a horizontal direction and a first obstruction block located at the first opening, the second sliding slot having a second opening in the horizontal direction and a second obstruction block located at the second opening, the horizontal direction being perpendicular to the vertical direction;

a first support, the first support having a first sliding portion and a first linkage portion, the first sliding portion being constrained by the first obstruction block to slide parallel to the horizontal direction in the first sliding slot; and a second support, the second support having a second sliding portion and a second linkage portion, the second sliding portion being constrained by the second obstruction block to slide parallel to the horizontal direction in the second sliding slot, the first linkage portion and the second linkage portion pushing against each other in line contact, so that the first support and the second support are mutually driven through the first linkage portion and the second linkage portion.

16. The keyswitch structure according to claim 15, wherein the first support has a through hole, and the first obstruction block is located in the through hole.

17. The keyswitch structure according to claim 15, wherein the first opening and the second opening are directed in opposite directions.

18. The keyswitch structure according to claim 15, wherein a rotation axis of the first support relative to the base is perpendicular to the vertical direction and the horizontal direction, the first support has a side arm portion, the side arm portion extends in an extending direction, the extending direction is perpendicular to the rotation axis, the first linkage portion is located at an end of the side arm portion in the extending direction, the first linkage portion comprises a basic engaging portion and an offset engaging portion, the basic engaging portion and the offset engaging portion are arranged at an interval in an arrangement direction, and the arrangement direction is perpendicular to the extending direction and the rotation axis.

19. The keyswitch structure according to claim 15, wherein the first support has a keycap connecting portion, and the first sliding portion is located between the keycap connecting portion and the first linkage portion.

20. The keyswitch structure according to claim 15, wherein the keycap support mechanism comprises a force-applying device connected to and between the first support and the second support, and the force-applying device applies force to the first support and the second support to force the first linkage portion and the second linkage portion to push against each other.

* * * * *